United States Patent
Cerea

(10) Patent No.: US 9,102,559 B2
(45) Date of Patent: Aug. 11, 2015

(54) PROCESS FOR MODIFYING THE STRUCTURE OF AN ORGANIC SLUDGE

(75) Inventor: Giuseppina Cerea, Rozzano (IT)

(73) Assignee: AMBIENTE E NUTRIZIONE S.R.L., Rozzano (MI) (IT)

(*) Notice: Subject to any disclaimer, the term of this patent is extended or adjusted under 35 U.S.C. 154(b) by 0 days.

(21) Appl. No.: 13/811,332

(22) PCT Filed: Jul. 20, 2011

(86) PCT No.: PCT/EP2011/003630
§ 371 (c)(1),
(2), (4) Date: Mar. 15, 2013

(87) PCT Pub. No.: WO2012/010300
PCT Pub. Date: Jan. 23, 2012

(65) Prior Publication Data
US 2013/0213796 A1    Aug. 22, 2013

(30) Foreign Application Priority Data
Jul. 21, 2010    (IT) .............................. MI2010A1346

(51) Int. Cl.
*C02F 11/12* (2006.01)
*C02F 1/48* (2006.01)
*C02F 11/00* (2006.01)

(52) U.S. Cl.
CPC . *C02F 11/12* (2013.01); *C02F 1/48* (2013.01); *C02F 11/127* (2013.01); *C02F 11/006* (2013.01)

(58) Field of Classification Search
CPC .......... C02F 11/12; C02F 1/48; C02F 11/006; C02F 11/127
USPC ....................................................... 204/553
See application file for complete search history.

(56) References Cited

U.S. PATENT DOCUMENTS

| 3,506,562 | A |   | 4/1970 | Coackley |          |
|-----------|---|---|--------|----------|----------|
| 3,962,069 | A | * | 6/1976 | Inoue et al. | 204/649 |
| 4,376,022 | A | * | 3/1983 | Porta et al. | 204/516 |
| 7,001,520 | B2| * | 2/2006 | Held et al. | 210/609 |
| 2005/0016870 | A1| * | 1/2005 | Berrak et al. | 205/687 |
| 2005/0199499 | A1| * | 9/2005 | Berrak et al. | 204/553 |
| 2010/0170854 | A1| * | 7/2010 | Casbeer et al. | 210/710 |

FOREIGN PATENT DOCUMENTS

WO    2009/017426 A1    2/2009

OTHER PUBLICATIONS

International Search Report issued in counterpart PCT Application No. PCT/EP2011/003630., dated Feb. 2, 2012.

* cited by examiner

*Primary Examiner* — Kishor Mayekar
(74) *Attorney, Agent, or Firm* — Silvia Salvadori, P.C.

(57) ABSTRACT

The present invention relates to a process, and respective operating apparatus, for modifying the structure of a sludge, in particular an organic sludge originating from a purification treatment of waste water, of the civil and industrial type, to be subjected to dehydration and/or drying, wherein the sludge is exposed to the action of an electric field generated by direct current.

11 Claims, 3 Drawing Sheets

PROCESS FOR MODIFYING THE STRUCTURE OF AN ORGANIC SLUDGE

This application is a U.S. national stage of PCT/EP2011/003630 filed on Jul. 20, 2011, which claims priority to and the benefit of Italian Application No. MI2010A 001346, filed on Jul. 21, 2010, the contents of which are incorporated herein by reference.

FIELD OF THE INVENTION

The present invention relates to a process for modifying the structure of a sludge and an apparatus for carrying out said process.

In particular, the invention refers to a process and apparatus for modifying the structure of an organic sludge originating from the purification of waste water, of the civil or industrial type, to be subjected to dehydration and/or drying.

KNOWN ART

It is known the need to dehydrate or dry sludge and similar dispersions of organic substances in an aqueous phase.

Depending on the quantity of dry matter of the final product, the sludge is either called a dehydrated or dried sludge.

In particular, in a dried sludge, the quantity of dry matter may constitute up to about 90% by weight of total weight of sludge, and is generally higher than 60% by weight, whereas in a dehydrated sludge the quantity of dry matter generally represents between 20 and 35% of the total weight of sludge.

In order to comply with the above said need, the known art provides various processes where drying is obtained, for example, by subjecting the organic sludge to high temperatures inside the dryer.

Sometimes the drying is also obtained by means of centrifugal action, for example when a turbo-dryer is employed.

Processes of the above said type suffer, although solving the problem, are not free of drawbacks, like for example a degradation of thermal yield which takes place during drying of sludge.

In particular, when the percentage of water in the sludge is still high, there is a first phase, where drying is easy and with a high thermal efficiency, which however is followed by a trend toward a reduction of efficiency, corresponding to the reduction of water content in sludge.

This degradation of thermal efficiency is a relevant drawback, since it negatively impacts the operating costs of the drying process, which has to be protracted for a long time, and at a high temperature, in order to obtain the desired result.

In case a dehydrated sludge is desired, the known art provides processes, which for example foresee a filtration and pressing treatment of sludge.

Even such processes though solving the above problem, have drawbacks in that they require for example long filtration times and considerable energy costs for pumping the organic sludge at high pressure in filter presses, in particular if a sludge with a high dry content is required.

Moreover, even in this case the efficiency of process diminishes as water is being removed from sludge.

SUMMARY OF THE INVENTION

An object of the present invention is to provide a process, and a corresponding operating apparatus, for modifying the structure of an organic sludge originating from a purification process of civil or industrial waste waters, which is able to allow the sludge to be dehydrated and/or dried with a high efficiency, i.e. in the case of a dehydration of sludge essentially performed by mechanical means, for example centrifugation or more or less intense filtration, as well as in the case of drying the sludge by essentially thermal means, and also in the case of a combination of a mechanical and thermal treatment, which are substantially simultaneous or successive.

The above object is achieved according to the invention by a process and an apparatus for performing said process, in which an organic sludge originating from a purification process of waste waters of civil or industrial type and being in the form of a wet solid, with a dry matter content higher than 10% by weight of the total weight of sludge, is exposed to an electric field generated by a direct current.

It has been discovered that a sludge of the above type, when exposed to an electric field generated by direct current, undergoes a structural transformation at the cellular level, mainly of mycelial cells, and in particular undergoes the destruction of the cellular meristem, with consequent release of up to 40% by weight on the total weight of sludge, of organic intracellular water, wherein this percentage is generally comprised between 5 and 15% by total weight of sludge.

The organic sludge which has undergone such a transformation acquires the physical appearance of a fluidized paste.

Intracellular water, i.e. water which is present within sludge cells, represents the percentage of water which is the most difficult to be removed during drying processes, in contrast to interstitial water, which is pretty easily removed by thermal action.

On the other side, dehydration processes, for example by filter-pressing, do not allow a substantial removal of intracellular water from a sludge.

Therefore, according to the invention, the organic sludge is exposed to said electric field generated by direct current, which is equal or lower than 100 V/0.01 m, preferably between 30 and 70 V/0.01 m, and even more preferably at about 50 V/0.01 m.

Regarding the intensity of the direct current generating the electric field, it is to be noted that it depends on the value of process parameters and treatment capacity of the employed apparatus.

Preferably, according to the invention, the organic sludge is continually fed into an area which is between a positive and a negative pole generating said electric field.

Preferably, the present process comprises a step of inactivating any free radical compounds which are possibly generated by exposing the sludge to the electric field.

Preferably, this inactivation step is carried out by exposing to the action of active carbon the atmosphere, which in turn is exposed to the electric field, i.e. the atmosphere in contact with the sludge being processed by the electric field, although the use of other substances with a selective action towards said radical compounds is not excluded.

The inactivation step may be subsequent to exposing the sludge to the electric field, or may be essentially simultaneous with exposing the sludge to the electric field.

In the first case, the inactivation step is preferably performed by conveying, for example by suction, said atmosphere into a closed space, where it is confined and subjected to the action of active carbon or similar substances, whereas in the second case the atmosphere is subjected to the action of active carbon or similar substances essentially in the same region of space where the electric field is generated.

Therefore, in both cases, the atmosphere contacting the sludge processed in the electric field is treated so as to eliminate, or avoid the dispersion of free radical compounds which may be of detriment to human health, and which may form during the process of structural modification of the organic matrix of sludge.

Advantageously, the present process may constitute a pretreatment of sludge for a subsequent dehydration and/or drying step of the above-mentioned type, or may be carried out as the same time as a a step of dehydrating or drying the sludge, as may be appreciated in the following, wherein in both cases the time for which said organic sludge is exposed to said electric field is preferably between 2 seconds and 10 minutes, and more preferably between 3 seconds and 5 minutes.

Preferably, the sludge exposed to the electric field originates from a preliminary step of mechanical dehydration, and has a dry matter content preferably equal or higher than 20% by weight of the total weight of sludge, .

According to the invention, the present process is carried out in an apparatus comprising inlet and outlet openings for feeding and discharging said sludge, and a path between said openings, to be run through by said sludge, wherein said path is at least partially delimited by a first and second element providing respective positive and negative poles generating said electric field that is originated by direct current.

Said first and second elements may be positioned at a predetermined distance to each other and may essentially consist of cylinders which may rotate in opposite directions, with the same or different rotation speed, or may essentially consist of plates or half shells, or the first and second elements may be coaxial to each other and essentially positioned one inside the other, as will be clarified in the following.

In order to generate the opposed polarization of first and second element forming said poles, there are provided means and electrical connections which may be made of a conductive metal material, for example copper or aluminum, or a conductive metal alloy, or a plastic material based on one or more conductive polymers.

In particular, it is possible to foresee the use of extrinsically as well as intrinsically conductive (or conducting) polymers known in the art, such as, for example, polyacetylene (PA), polyparaphenylene (PPP), polyparaphenylene sulphide (PPS), polyparaphenylene vinylene (PPV), polyaniline (PANI), polypyrrole (PPy), polythiophene (PT), polyisothianaphthene (PITN), polyethylene dioxythiophene (PEDOT) and corresponding mixtures.

As previously noted and according to the invention, after exposing the sludge to the electric field, the sludge may be fed into a dehydrating unit, into a drying unit, or also to serially connected units of the above type, and to this end, units comprising one or more band type filters, vacuum or pressure filters, a centrifuge, a dryer of a conventional, for instance rotating, type, a turbo-mixer or a turbo-dryer may be used, or the dehydration or the drying may be carried out in the same apparatus in which the sludge is exposed to the electric field, for example by using a turbo-mixer or a turbo-dryer.

Therefore, according to the above description, according to an embodiment, the present apparatus essentially comprises a two-cylinder calender, wherein said first and second element essentially consist of respective first and second rollers, which are preferably parallel to each other, positioned at a predefined distance to each other, which rotate in a clockwise and counterclockwise direction, respectively, with an opposed polarity, which provide said positive and negative poles, generating the electric field, between which a flow of sludge to be processed is fed, i.e. is passed, in a continuous way.

According to this embodiment, said means and electrical connections may be provided by a first and second conductive brush, which provide the direct current to the respective rollers.

Preferably, the above apparatus comprises a containment or confining box, in which said calender is housed, which is provided with inlet and outlet openings for the flow of sludge to be processed, in which there are housed suitable means provided with one or more substances that are selective towards free radical compounds which may be generated during exposure of the sludge to the electric field. These means preferably consist of filters with active carbons or similar substances, which are active and selective towards said radical compounds.

The sludge, which is fed in a continuous flow to said apparatus and is transported to a passage area of said calender comprised between the first and second rotating roller, passes through the electric field in the area between the rollers, undergoing, because of the electric field, a structural modification which causes said release of the water contained in the cells of the sludge and transition of same to a physical state corresponding to a fluidized paste.

The sludge leaving the calender as a fluidized paste may then be fed to one or more dehydrating and/or drying units, as previously noted, which may be of the continuous or discontinuous cycle type, achieving the removal of said intracellular water which has been released by the sludge, and the removal of interstitial water, in a quantity which is dependent on the operating parameters of dehydration and/or drying process and on the characteristics of desired final product.

If a final product having a high content of dry matter is desired, it is preferable to feed the sludge flow leaving the calender into a turbo-dryer, which essentially comprises a cylindrical tubular body, provided with a heating jacket, which is closed at opposed ends by bottoms, which is provided with inlet and outlet openings, in which a coaxial bladed rotor is rotatably supported.

In the turbo-dryer, which is provided with a suitable motor which rotates the rotor at a speed between 200 and 1500 rpm, preferably 400-600 rpm, the sludge flow is subjected to a drying step, through thermal action due to the heating jacket which is coaxial to the cylindrical tubular body and is to be run through by a fluid, for example diathermic oil or vapor, as well as through centrifugal action due to the bladed rotor, which is provided with blades which are helically arranged and oriented so as to centrifuge and simultaneously transport towards the outlet opening(s) the flow of sludge fed into the turbo-dryer.

Therefore, the turbo-dryer discharges a flow of dried sludge with a high percentage of dry matter, higher than 70% by weight on the total weight of sludge, preferably higher than 80% by weight.

According to the above description, and according to a further embodiment of the invention, the process for modifying the structure of an organic sludge is performed in an apparatus, in which said first and second elements providing said poles essentially consist of respective half shells or plates generating the electric field, between which an element of insulating material is longitudinally arranged, wherein said elements define an essentially tubular body (diffuser) provided with inlet and outlet openings for sludge to be processed.

In particular, one of first and second plate provides the cathode, or the anode, whereas the other plate is connected to earth through the opposed pole.

In said tubular body, which preferably has an essentially parallelogram shaped section, without excluding other different geometries, the first and second plate may be parallel to each other or be divergent towards an end of the diffuser, i.e. towards one of the inlet or outlet openings, according to needs.

According to this embodiment, a flow of sludge is fed in a continuous way into the tubular body, through the inlet opening, and, inside the tubular body, the same is exposed to the action of said electric field generated by a direct current supplied to said plates, which therefore form the positive and the negative pole, between which the electric field is formed.

In this case too the flow of sludge undergoes a structural modification comprising the rupture of the cellular membrane and release of intracellular water of sludge, which acquires the consistency of a fluidized paste.

After exposure to the electric field, i.e. after having been discharged from the tubular body through the outlet opening, the flow of sludge may be subject to a mechanical dehydration and/or a thermal drying step, in one or more of said units, as indicated in the previous description, to which reference is made.

According to the above description and according to further embodiments of the invention, the process for modifying the structure of an organic sludge is performed in an apparatus, in which said first and second element forming said poles, essentially consist of a tubular cylindrical body and a coaxial bladed rotor, positioned inside the cylindrical tubular body of a turbo-mixer or a turbo-dryer.

In particular, in this case, the turbo-dryer is similar to the above described turbo-dryer, to which reference is made, and is also able to internally generate said electric field.

Also the turbo-mixer is able to internally generate said electric field, and is similar to the turbo-dryer, to which reference is made, except for not providing a heating jacket.

In detail, the cylindrical tubular body of the turbo-mixer and the turbo-dryer is such as to form a positive pole, whereas the bladed rotor provides the negative pole, or vice versa, i.e. the cathode and the anode generating said electric field thanks to said electrical means and connections previously described.

In these embodiments, a flow of sludge is continually fed inside the cylindrical tubular body where it is exposed to the action of the electric field, causing a structural modification of the same, with release of intracellular water from the cells of sludge, which acquires the physical state of a fluidized paste.

At the same time, the sludge is also subjected to centrifugation caused by the bladed rotor, and if a heating jacket is provided, it is also subjected to a drying step through thermal action.

As previously described, it has been found that an organic sludge coming from a purification process of waste water, which is exposed to the electric field generated by direct current, undergoes a structural modification which causes the release of water contained in the cells (intracellular water), which, therefore, becomes easily removable from the sludge during a mechanical dehydration step performed for example by more or less intensive centrifugation or filtration, and/or thermal drying.

Without limiting the protection scope of the present invention to a certain theory, we think that a considerable increase of thermal yield during a drying step carried out on structurally modified sludge may be explained as follows.

The water in a dehydrated sludge is formed by interstitial and constitutive water, wherein the latter is present inside the cells of the organic matrix of sludge.

During a conventional thermal drying step, interstitial water is easier to be removed, since thermal conduction transport is performed.

After interstitial water has been removed, the cells of the organic sludge become elastic and undergo a thermal transfer through hot air convection, i.e. heated air from the thermal process, which, in contact with sludge, removes intracellular water.

The transition from thermal transfer by conduction to thermal transfer by convection causes a degradation of the thermal efficiency of a dryer.

According to the present invention, the cells of sludge subjected to an electric field undergo a structural transformation which essentially involves the explosion of the cellular membrane, with a discharge of intracellular constitutive water.

The expulsion of intracellular water causes the most part of heat in the dryer to be transferred by conduction, with an increase of thermal efficiency.

Moreover, the possibility to easily remove constitutive water expelled from cells following their rupture causes an efficiency increase even when the sludge is subjected to mechanical dehydration, for example by filtration, pressing or centrifugation.

Further characteristics and advantages of the present invention will become apparent from the following description, which is provided in an illustrative and non limiting way, with reference to appended drawings.

DETAILED DESCRIPTION

Figure 1:
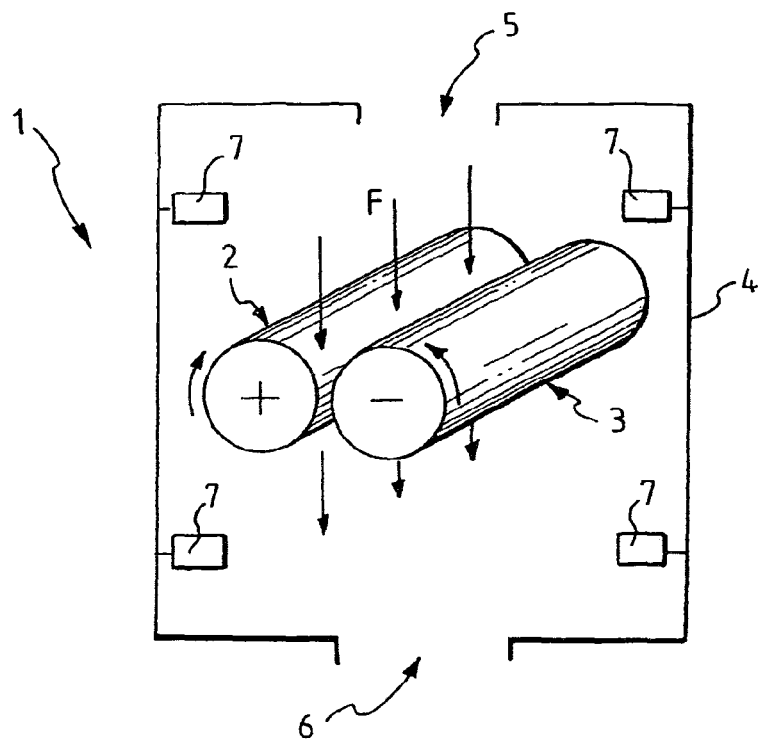
FIG. 1 schematically shows an apparatus for modifying the structure of an organic sludge originating from a purification treatment of waste waters, of the civil or industrial type, according to an embodiment of the present invention, FIG. 2 schematically shows a side view of a detail of apparatus of FIG. 1, associated to a turbo-dryer, which is shown in a section, according to the invention, FIGS. 3 and 4 schematically show front and rear views, respectively, of an apparatus for modifying the structure of an organic sludge originating from a purification treatment of waste waters, of the civil or industrial type, according to a modified embodiment of the present invention, FIG. 5 schematically shows a side view of apparatus of FIGS. 3 and 4, FIG. 6 schematically shows a side sectional view of an apparatus for modifying the structure of an organic sludge originating from a purification treatment of waste waters, of the civil or industrial type, according to a modified embodiment of the present invention.

With reference to FIG. 1, an apparatus for modifying the structure of an organic sludge originating from a purification treatment of civil or industrial waste waters is generally indicated by 1.

The apparatus 1 essentially comprises a first and second element adapted to generate an electric field, which, in particular, consist of a first and second roller of a two-cylinder calender, which are indicated by 2 and 3, respectively.

Rollers 2 and 3, which rotate in a clockwise and counter-clockwise direction, respectively, are parallel and spaced from each other.

The first and second roller 2, 3 are adapted to generate said electric field and to this end they may be provided with a different polarity, for example first roller 2 with a positive and second roller 3 with a negative polarity, as illustrated by the example in FIG. 1, therefore providing one positive and one negative pole, respectively.

Electrical means/connections are provided for supplying a direct current to first and second rollers 2, 3, which are not shown in the figure of example.

According to an embodiment, apparatus 1 also comprises a housing or containment box, in which first and second roller 2, 3 are housed, and which is generally shown in 4. In the housing box, which is provided with inlet openings 5 for sludge to be processed and outlet openings 6 for sludge already processed, the atmosphere contacting the processed sludge is confined.

The apparatus 1 also comprises a plurality of filters 7, which are housed inside the box 4, and which are provided so as to selectively interact with free radical compounds which may be generated following exposure of the sludge to the electric field, which causes the structural modification of the organic matrix of the sludge itself.

The box confining the atmosphere which is in direct contact with the sludge processed in the electric field and the filters acting on the same atmosphere advantageously eliminate or avoid dispersion of said free radical compounds which may be detrimental to human health.

In apparatus 1, the present process is performed by feeding through the inlet opening 5 of containment box 4 a continuous flow of filter-pressed organic sludge, indicated by F, having a dry matter content of 20% by weight of the total weight of sludge, and by generating a direct current electric field at 50 V and 50 A, corresponding to 2.5 kW, which is supplied to first and second roller 2, 3 of said two-cylinder calender.

The flow of sludge in the path between inlet and outlet openings of apparatus, transits between the first and second roller of the calender, where it is subjected to the action of the electric field generated between the rollers, for a time period of about 5 minutes.

The sludge, exposed to the action of the electric field, in this case passing through the electric field, undergoes a structural transformation essentially consisting in the breaking of the cells of the organic matrix, with subsequent release of the constitutive water of the sludge (intracellular water), and takes the appearance of a fluidized paste.

The quantity of water released by cells is about 10% by weight of the total weight of sludge.

Figure 2:
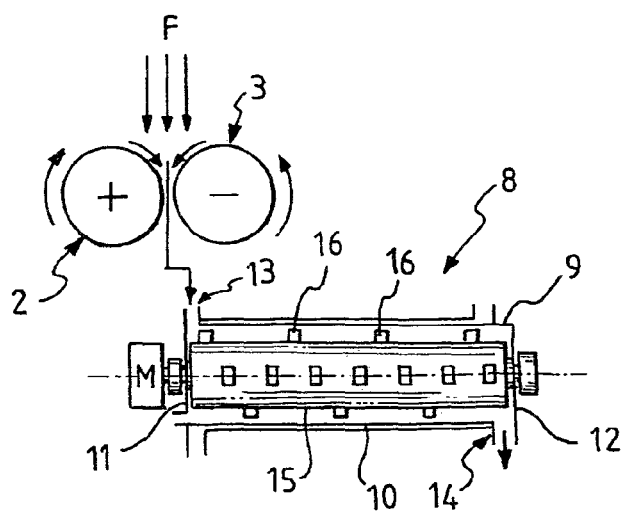

According to an aspect of the invention shown with reference to the example of FIG. 2, where said apparatus in which the present sludge modification process is carried out, is shown as limited to the two-cylinder calender, the flow of sludge exiting apparatus 1 is fed into a turbo-dryer 8, essentially comprising a cylindrical tubular body 9 provided with a heating jacket 10, which is closed at opposing ends by bottoms 11, 12, provided with inlet and outlet openings 13, 14, inside which a bladed rotor 15 is rotatably supported, which is coaxial and provided with a plurality of helically arranged blades 16.

In particular, the cylindrical tubular body 8 has a diameter equal to 0.9 meters, is 7.5 meters long, and is able to nominally process 1000 kg of sludge with an evaporative capacity of about 750 l/h of water at conventional process conditions, absorbing 800 kcal/l of evaporated water, with a speed of the bladed rotor of about 600 rpm, the balded rotor being driven by a suitable motor M.

Thanks to the present structural modification process, which the sludge flow has been subjected to, in this case, prior to the thermal drying and centrifugation step, in the turbo-dryer 1200 kg of sludge have been processed, with an energy consumption of about 700 kcal/l, and the turbo-dryer discharges a dried sludge (final product) comprising 80% by weight of dry matter on the total weight of dried sludge.

In practice, the structural modification of sludge allows the increase of the thermal exchange surface area with the heated wall of the turbo-dryer yielding a reduction of specific heat consumption and, at the same time, an increase of the evaporative capacity of the turbo-dryer, the dimensions being the same.

Figure 3:
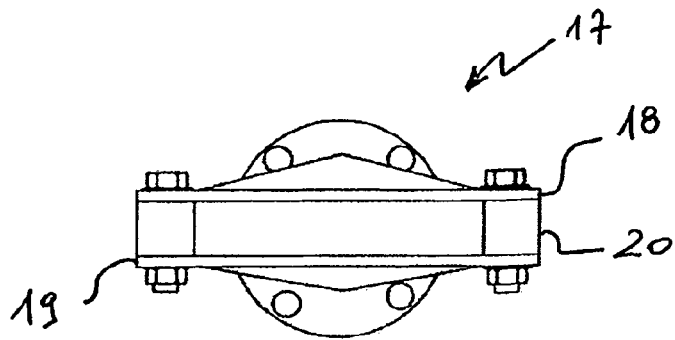
Figure 4:
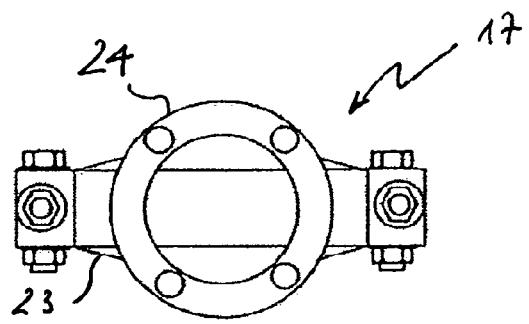
Figure 5:
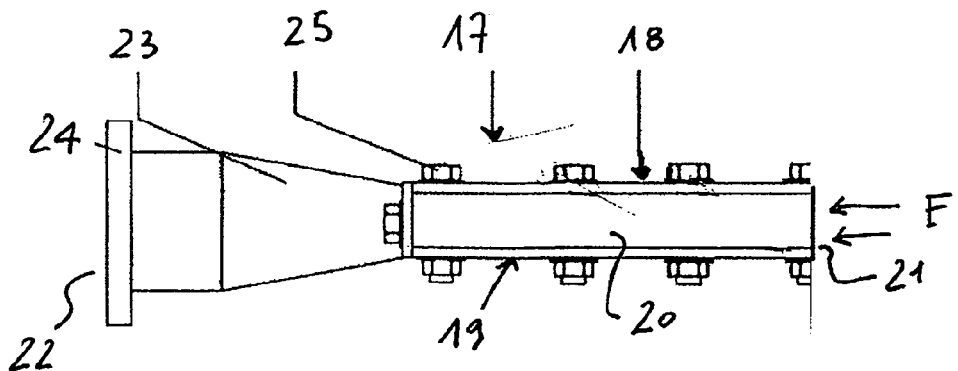

According to a modification of the embodiment and with reference to the example of FIGS. 3-5, the present invention provides an apparatus for modifying the structure of an organic sludge, essentially comprising a tubular body 17 (diffuser), which is essentially delimited by a first and second element, which are adapted to generate an electric field, and which, in particular, essentially consist of a first plate or half shell 18 and a second plate or half shell 19, which are longitudinally separated by an insulating element 20 made of dielectric material.

The first and second plate form an anode and cathode, respectively, between which a flow of sludge F is continuously fed through an inlet opening 21, and is discharged through an outlet opening 22.

At one or both inlet and outlet openings, the apparatus according to the present invention may comprise end portions which are such as to be associated to other apparatus, or other plant components, as illustrated in the examples of FIGS. 3-5, wherein the tubular body 17 comprises a sleeve 23 having a flared segment and a flange 24 for coupling one of said further apparatus.

As shown in the example of FIGS. 3-5, said first and second plate and the intermediate insulating element are assembled in such a way as to provide the tubular body 17 by using suitable fixing means, like screws or nuts made of dielectric material, as in 25.

The present method is carried out in said apparatus by feeding the sludge into the tubular body 17 through said inlet opening, and inside the tubular body, along the path from inlet to outlet opening, the sludge is subjected to an electric field generated by direct current supplied to said plates which therefore provide a positive pole and a negative pole, respectively.

Also in this case the flow of sludge undergoes a structural modification with cell membrane rupturing and subsequent release of intracellular water from the cells of the sludge, which takes the appearance of a fluidized paste.

The sludge discharged from the tubular body 17 through outlet opening is then subjected to a dehydration and/or drying treatment in said units according to the previous description, to which reference is made.

According to such an embodiment, in order to inactivate free radical compounds possibly forming during exposure of the sludge to the electric field, the atmosphere contacting the sludge in the tubular body 17 is exposed to the action of suitable means selective towards said free radical compounds, like e.g. active carbon filters, after having been conveyed into a suitable closed space, or along a predefined path, for example by suction through a ventilator, which is not shown in these figures.

Experiments have been conducted by feeding an organic sludge into the apparatus shown in the example of FIGS. 3-5, wherein the feeding (dosing) capacity has been modified, as well as the potential difference between plates generating the electric field, and the exposure time of sludge to the electric field (time for passage).

In any case, the treated sludge had an initial water content equal to 80.09% by weight of the total weight of sludge. The distance between the plates was 0.01 m.

The results of these experiments are summarized in table 1.

TABLE 1

| Experiment Nr. | Final humidity % | Dosing capacity Kg/h | Time for passage mm:ss | Potential difference V | Absorbed current A |
|---|---|---|---|---|---|
| 1 | 73.90 | 22 | 01:10 | 30 | 75 |
| 2 | 72.09 | 30 | 01:06 | 40 | 100 |
| 3 | 72.89 | 45 | 00:44 | 50 | 125 |
| 4 | 73.28 | 45 | 00:44 | 60 | 125 |
| 5 | 74.82 | 90 | 00:23 | 62 | 150 |

The temperature of sludge after exposure to the electric field was always between 37 and 40° C.

The temperature at stabilized conditions of both biased plates was 37° C. for the positive pole and 83° C. for the negative pole.

Humidity of sludge has been measured as follows.

A specimen of sludge in a paste-like form has been dried in an oven to 105° C. until a constant weight has been achieved. The humidity contained in the specimen of sludge has been obtained by calculating the weight difference before and after drying.

The measured humidity corresponded to the water bound or contained in sludge cells (intracellular water) and disregarded free and superficial water.

Prior to drying in a stove, free water in the sludge specimen has been mechanically removed through the following procedure.

Four paper filter discs having a diameter of 120 mm have been superimposed and positioned on a plastic knurled plane.

About 10 grams of specimen have been uniformly distributed in a thin layer over the overlaid filter discs.

The sludge specimen has been covered by four superimposed paper filter discs with a diameter of 120 mm.

The pile of filter paper discs comprising the sludge specimen has been covered by a plastic knurled plane.

A 5 kg weight has been positioned over the plastic knurled plane covering the pile of paper filter discs.

After 10 minutes the compressed sludge specimen has been removed with a spatula, and then weighted and dried in a stove.

In the examples of FIGS. 1-5, a sludge dehydration or drying process following the exposure of same sludge to an electric field has been described.

According to the present invention, a sludge dehydration or drying process may be performed simultaneously with the exposure of the same sludge to an electric field generated by direct current.

In particular, for a simultaneous mechanical dehydration step, in particular by centrifugation, the present invention provides an apparatus essentially comprising a turbo-mixer, whereas in order to provide a simultaneous drying step, the present invention provides an apparatus essentially comprising a turbo-dryer, wherein in both cases the electric field is generated within the turbo-mixer or turbo-dryer.

Figure 6:
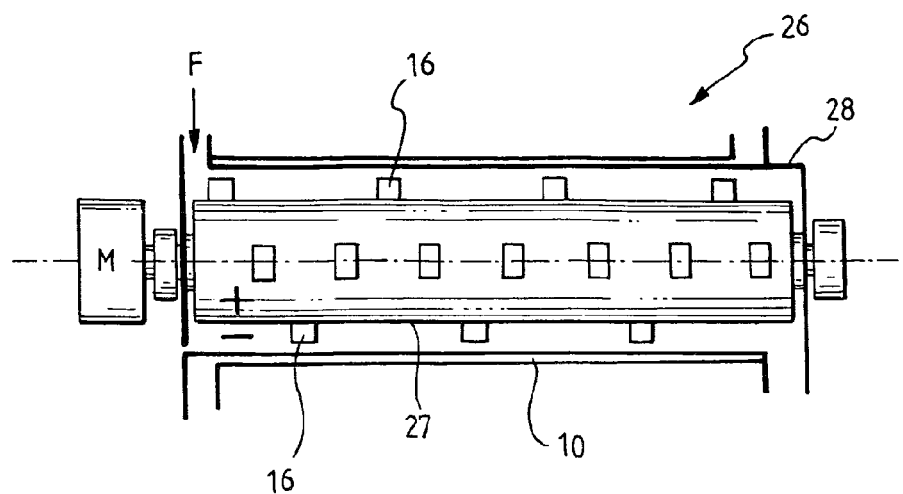

Regarding the turbo-dryer, it is to be noted that it is essentially similar to the turbo-dryer 8 described above with reference to FIG. 2, to which reference is being made, and it is shown in FIG. 6, keeping the previously used reference numerals for parts which are structurally and functionally the same.

According to the invention, the turbo-dryer of FIG. 6, indicated by 26, is also adapted to internally generate the electric field and to this end the cylindrical tubular body and the bladed rotor form a first and second element, respectively, for providing poles generating said electric field.

In particular, in the present example, the bladed rotor, indicated by 27, is adapted to form a positive pole, whereas the cylindrical tubular body 28 is adapted to form the negative pole, i.e. cathode and anode.

A flow of sludge F is continually fed into the turbo-dryer 26, where it is subjected to the action of the electric field which causes its structural modification with intracellular water release from the cells of the sludge, which then appears like a fluidized paste.

Inside the turbo-dryer, the sludge is also subjected to drying through thermal effect caused by the heating jacket 10 of the turbo-dryer as well as through centrifugal action caused by the bladed rotor, in particular the blades 16.

The turbo-dryer 26 then discharges a dried sludge having a high content of dry matter.

Regarding the use of the above-mentioned turbo-mixer, it is to be added that it is essentially corresponding to said turbo-dryer 26, to which reference is being made, except for the fact that it does not comprise a heating jacket.

In this case, a flow of sludge inside the turbo-mixer is exposed to the action of the electric field and to centrifugation by the bladed rotor.

According to the invention, the sludge flowing out from the turbo-mixer may be then subjected to further dehydration steps, such as for example a more or less intense filtration, possibly to drying, for example by using a turbo-dryer, optionally combining an initial mechanical dehydration with a subsequent thermal drying.

The advantages of the present invention, which are apparent from the description, are important from an energetic point of view if it is desired to obtain a dehydrated and dried sludge from an organic sludge originating from a purification process of civil or industrial waste waters.

Thanks to the present invention, i.e. thanks to the structural transformation of sludge, it is in fact possible to increase the thermal efficiency in a drying process, as well as the efficiency of dehydration processes carried out for example by means of centrifuges, filters, presses or similar.

The person skilled in the art, in order to comply with specific and contingent needs, may introduce various modifications to the process for modifying the structure of a sludge and to the respective apparatus provided for performing the same in the described embodiments, wherein these modifications all lie within the protection scope of the present invention, as defined in the following claims.

The invention claimed is:

1. Process for modifying the structure of an organic sludge to be subjected to drying, comprising a step in which said organic sludge, being in the form of a wet solid with a content of dry matter equal to or higher than 20% by weight of the total weight of the sludge, is exposed solely to the action of an electric field generated by direct current, which is comprised between 40 V/0.01 m and 100 V/0.01 m, wherein said electric field is generated by a positive pole and by a negative pole between which said sludge is fed in a continuous manner, wherein said positive pole and said negative pole consist of a first plate and of a second plate separated by an insulating element, defining a tubular body having an inlet opening and an outlet opening for said sludge, wherein said sludge, following said exposure to said electric field is subjected to a drying step.

2. Process according to claim 1, wherein said electric field is comprised between 40 V/0.01m and 70 V0.01 m.

3. Process according to claim 1, wherein said sludge is exposed to said electric field for a time period comprised between 2 seconds and 10 minutes, so as to cause in said sludge the release of intracellular water in a quantity comprised between 5% and 40% in weight over the total weight of the sludge.

4. Process according to claim 1, wherein said poles, positive and negative, consist of a first roller and a second roller of a two-cylinder calendar machine.

5. Process according to claim 4, wherein said first and second rollers rotate at different velocities to each other.

6. Process according to claim 1, wherein said poles, positive and negative, consist of a cylindrical tubular body and of a coaxial bladder rotor internal to the cylindrical body of a turbo-mixer.

7. Process according to claim 1, wherein said poles, positive and negative, consist of a cylindrical tubular body and of a coaxial bladed rotor internal to the cylindrical tubular body of a turbo-dryer.

8. Process according to claim 1, comprising inactivation step of free radical compounds that have been generated by exposing said sludge to said electric field.

9. Process according to claim 8, wherein said inactivation step is carried out using active carbon.

10. Process according to claim 1, wherein said electric field is about 50 V/0.01 m.

11. Process according to claim 1, wherein said sludge is exposed to said electric field for a time period comprised between 3 seconds and 5 minutes.

* * * * *